United States Patent
Rich

(10) Patent No.: US 7,573,608 B2
(45) Date of Patent: Aug. 11, 2009

(54) METHOD OF ESTIMATING TRAP FROM SPECTRAL REFLECTANCE FACTOR

(75) Inventor: Danny Clark Rich, Hamilton, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 563 days.

(21) Appl. No.: 11/273,227

(22) Filed: Nov. 14, 2005

(65) Prior Publication Data
US 2007/0109566 A1    May 17, 2007

(51) Int. Cl.
*G06F 15/00* (2006.01)
*G06K 15/00* (2006.01)
*G03F 3/08* (2006.01)
*H04N 1/46* (2006.01)

(52) U.S. Cl. .......... 358/1.9; 358/3.1; 358/518; 358/519; 358/501; 358/504; 382/162; 382/167

(58) Field of Classification Search .......... 358/1.9, 358/1.1, 1.14, 3.1, 518, 519, 500, 501, 504, 358/1.13, 2.1, 1.4; 382/162, 167
See application file for complete search history.

(56) References Cited

U.S. PATENT DOCUMENTS

| | | | | |
|---|---|---|---|---|
| 4,551,751 A | * | 11/1985 | Jung | 358/500 |
| 5,668,931 A | * | 9/1997 | Dermer | 358/1.4 |
| 6,262,810 B1 | * | 7/2001 | Bloomer | 358/1.9 |
| 7,253,924 B2 | * | 8/2007 | Sanger et al. | 358/1.9 |
| 2003/0025925 A1 | * | 2/2003 | Elsman et al. | 358/1.9 |
| 2003/0086108 A1 | * | 5/2003 | Barkis | 358/1.13 |
| 2003/0156299 A1 | * | 8/2003 | Martinez et al. | 358/1.9 |

\* cited by examiner

*Primary Examiner*—Edward L Coles
*Assistant Examiner*—Charlotte M Baker
(74) *Attorney, Agent, or Firm*—Kramer Levin Naftalis & Frankel LLP

(57) ABSTRACT

A method of estimating the trap of an overprint of at least two primary colors from the spectral density curve of the overprint by computing the amounts of the two primary colors that will produce a spectral density curve that matches the spectral density curve of the overprint, and then relating the amounts to one another.

11 Claims, 3 Drawing Sheets

METHOD OF ESTIMATING TRAP FROM SPECTRAL REFLECTANCE FACTOR

BACKGROUND OF THE INVENTION

1. Field of the Invention

Figure 1:
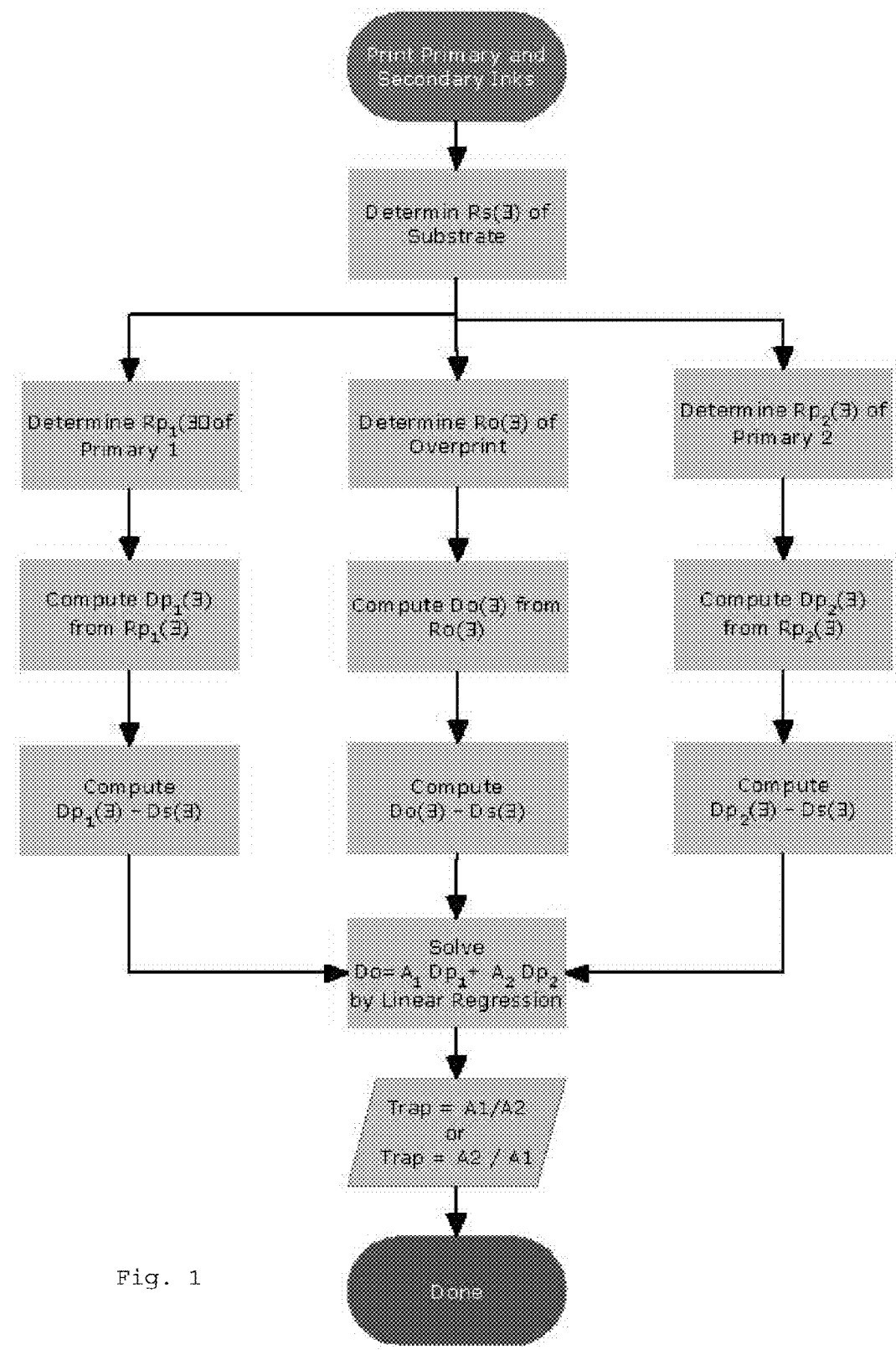
Figure 2:
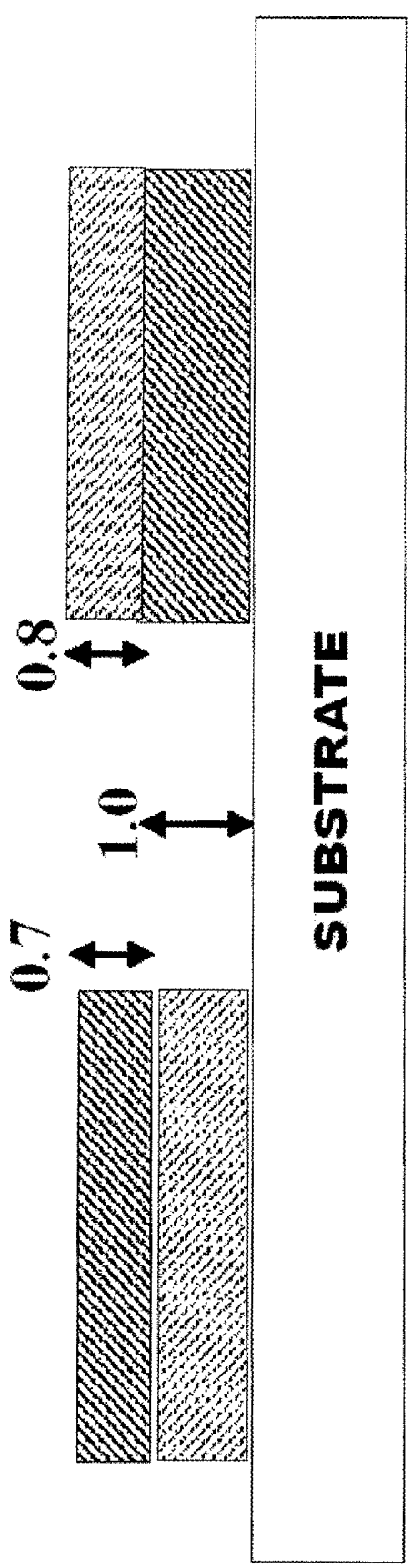
Figure 3:
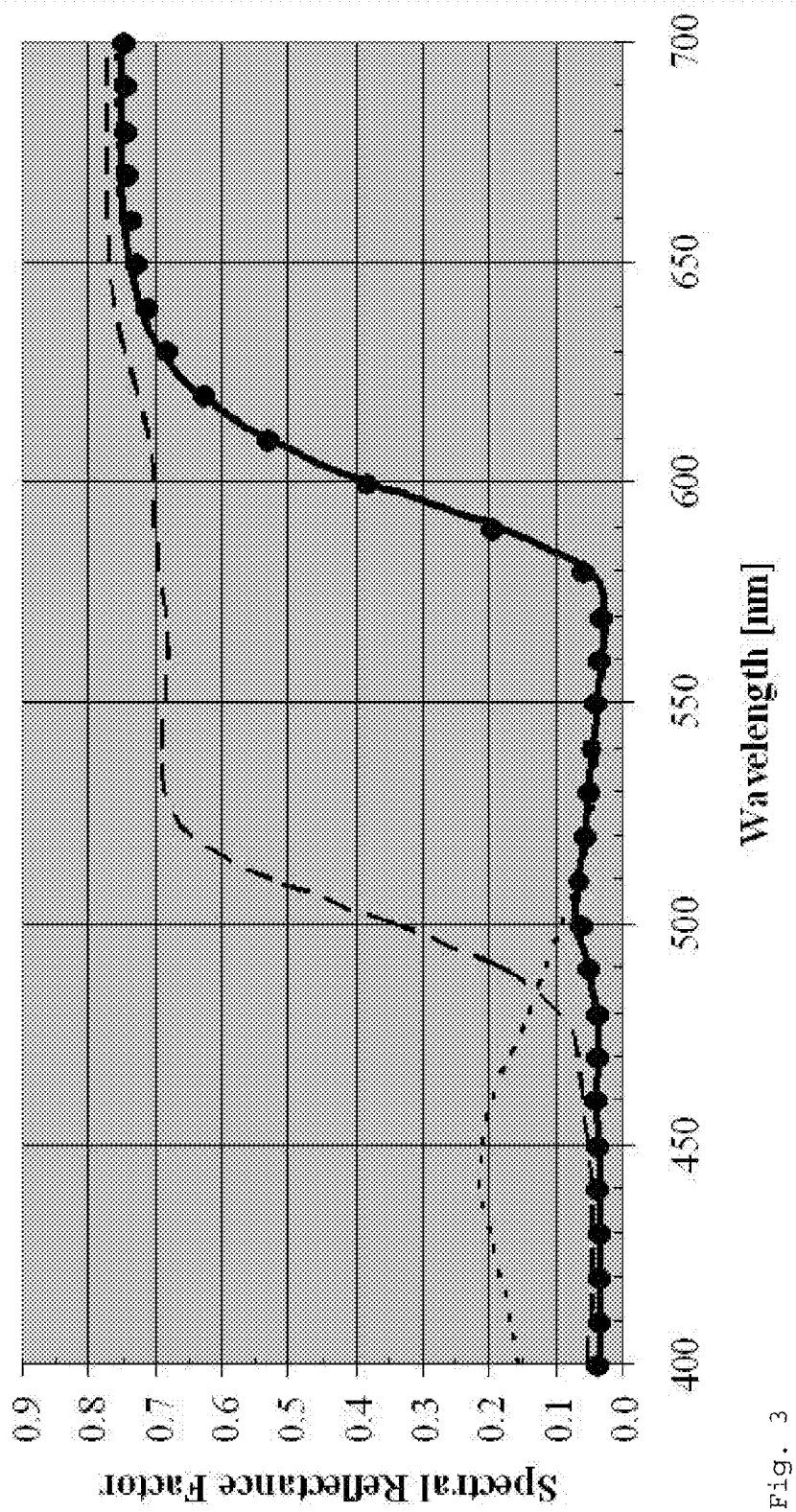

The present invention relates generally to process printing on multi-color presses, and particularly to an improved method of predicting the trap of an overprint of at least two primary colors.

2. Description of Related Art

In wet-on-wet printing on multi-unit presses, it is necessary, in relevant image areas, for ink to transfer or "trap" on top of a previously printed, wet ink film. In an ideal situation, the same amount of ink would transfer to previously printed ink as transfers to plain unprinted paper. However, ink transfer to unprinted paper is usually greater than ink transfer to a previously printed ink film. The amount of ink that actually transfers to a previously printed, wet ink film is commonly referred to as "trap."

The Preucil trap equation relates the solid ink density for individual inks with the density of the overprint of those inks. The Preucil trap equation assumes that the densities of two overprinted inks will add, and that any deviation from this is solely due to a thinner second layer of ink. The assumption, again, is that ink will not stick as well to ink as to paper.

According to Preucil:

$$\text{TRAP} = \frac{D_{OP} - D_1}{D_2}$$

where:

$D_{OP}$ is the density of the overprint, $D_1$ is the density of the first printed ink, and $D_2$ is the density of the second printed ink.

Normally trap is used as a press diagnostic. It is measured on press to help determine where a problem might be. For example, if the trap is out of the normal range, then the assumption is that the tack of the inks is not correct, or there is an ink-water balance problem.

In practice, the trap is measured by taking densitometer readings of the overprint color and the two primary colors with the appropriate color filter (red, green and blue) and then relating the densities measured according to the Preucil trap equation. The resulting trap can then be used as a gauge whether adjustment of the ink and/or the press machinery is in order.

One problem surrounding this method of determining the trap is the fact that the formula is complicated, requiring selection of the appropriate color filter (red, green, blue) and taking readings of the overprint color and the two primaries with the same filter. This may result in a less than optimum characterization of at least two of the inks. For example, the green overprint is measured with the red filter and so are the two primaries, cyan and yellow. The red filter is designed to measure cyan ink density and is thus optimum for that primary. But the red filter does not measure the density of the yellow ink at all and only partially reads the green ink density. The result is an approximation to the trap but is rarely exact.

Another problem is that the Preucil trap formula requires knowledge of the order in which the inks making up the overprint have been printed. Such knowledge may or may not be readily available.

Accordingly, an object of the present invention was to provide a statistically valid method for determining the trap in a simple and completely general manner.

SUMMARY OF THE INVENTION

These and other objects were met with the present invention, which relates in a first embodiment to a method of estimating the trap of an overprint of at least two primary colors, said method comprising the following steps:

a) determining the spectral density curve of the overprint;

b) computing the amounts of said two primary colors that will produce a spectral density curve that matches the spectral density curve of the overprint; and c) relating said amounts to yield an estimate of the trap.

The term "matches" as used herein embraces not only exact matches, but substantial matches, i.e., matches identical to about 99%.

In a second embodiment, the present invention relates in a second embodiment to a printing method comprising the following steps:

a) printing an overprint of at least two primary colors onto a substrate;

b) printing the two primary colors onto the same substrate; and c) subjecting the printing in a) and b) to the method according to the trap estimation method above.

DETAILED DESCRIPTION OF THE INVENTION

The inventive trap estimation method is applicable to any overprint of at least two colors, for example, those produced by the Hexachrome® six color process (Pantone, Inc., Carlstadt, N.J.) and the Opaltone® seven color process (Opaltone, Inc., Charlotte, N.C.). In one preferred embodiment, the overprint is a two-color red, green or blue overprint. In another preferred embodiment, the overprint is an overprint of more than two primary colors, very preferably six or seven primary colors.

In a preferred embodiment, the spectral density curve of the overprint is determined by a method comprising the following steps:

a) subjecting the overprint to a spectrodensitometer and determining a spectral reflectance factor curve for the overprint;

b) converting the spectral reflectance factor curve for the overprint to a spectral density curve for the overprint using the formula:

$$D_\lambda = -\log(R)$$

wherein $D_\lambda$ represents the spectral density at a given wavelength; and $R_\lambda$ represents the spectral reflectance at the given wavelength.

In an especially preferred embodiment, the spectral reflectance factor curve for the overprint is determined by a method comprising the following steps:

a) determining the spectral reflectance factor curve for the overprint plus substrate;

b) determining the spectral reflectance factor curve for the substrate alone; and c) subtracting the spectral reflectance factor curve for the substrate alone from the spectral reflectance factor curve for the overprint plus substrate to yield the spectral reflectance factor curve for the overprint.

In a preferred embodiment, the amounts of said two primary colors that will produce a spectral density curve that matches the spectral density curve of the overprint are computed by a method comprising the following steps:

a) subjecting each of said two primary colors to a spectrodensitometer and determining spectral reflectance factor curves for each of said two primary colors;

b) converting the spectral reflectance factor curves for each of the two primary colors to spectral density curves for each of the two primary colors using the formula:

$$D\lambda = -\log(R)$$

wherein $D_\lambda$ represents the spectral density at a given wavelength; and $R_\lambda$ represents the spectral reflectance at the given wavelength; and c) subjecting the spectral density curves for the overprint and for each of the two primary colors to the mixing relation equation:

$$D_{\lambda, overprint} = A_1 D_{\lambda, primary\ 1} + A_2 D_{\lambda, primary\ 2}$$

wherein $D_{\lambda, overprint}$ represents the spectral density of the overprint at a given wavelength;

$D_{\lambda, primary\ 1}$ represents the spectral density of a first primary color at the given wavelength;

$D_{\lambda, primary\ 2}$ represents the spectral density of a second primary color at the given wavelength;

$A_1$ represents the amount of the first primary color; and $A_2$ represents the amount of the second primary color.

In an especially preferred embodiment, the spectral reflectance factor curve for each of the two primary colors is determined by a method comprising the following steps:

a) determining the spectral reflectance factor curve for the primary color plus substrate;

b) determining the spectral reflectance factor curve for the substrate alone; and c) subtracting the spectral reflectance factor curve for the substrate alone from the spectral reflectance factor curve for the primary color plus substrate to yield the spectral reflectance factor curve for the primary color.

In another especially preferred embodiment, $A_1$ and $A_2$ are solved for by a linear regression analysis using measurements of $D_{\lambda, overprint}$, $D_{\lambda, primary\ 1}$ and $D_{\lambda, primary\ 2}$ obtained at a plurality of wavelengths. Particularly preferred is an embodiment in which $A_1$ and $A_2$ are solved for by a linear regression analysis using measurements of $D_{\lambda, overprint}$, $D_{\lambda, primary\ 1}$ and $D_{\lambda, primary\ 2}$ obtained at at least ten different wavelengths. In a very particularly preferred embodiment, measurements are taken over the entire spectrum of wavelengths from 400-700 nm, especially in 10 nm intervals, yielding 31 data points, or in 20 nm intervals, yielding 16 data points.

In a preferred embodiment, the amounts are related to yield an estimate of trap as follows:

$$T = \frac{\text{smaller of } A_1 \text{ or } A_2}{\text{larger of } A_1 \text{ or } A_2};$$

wherein

T represents the trap;

$A_1$ represents the amount of a first primary color; and $A_2$ represents the amount of a second primary color.

In one preferred embodiment, the overprint is a red overprint and the at least two primary colors are yellow and magenta. In an especially preferred embodiment, the following mixing relation equation can be used to predict the calculated red overprint at a given wavelength ($\lambda$):

$$R_{\lambda,\ Red}(\lambda) = 10^{\{\log(R_{\lambda, substrate}) + Y[\log(R_{\lambda, yellow}) - \log(R_{\lambda, substrate})] + M[\log(R_{\lambda, magenta}) - \log(R_{\lambda, substrate})]\}}$$

wherein $R_{\lambda,\ Red}$ represents the reflectance of the red overprint;

$R_{\lambda,\ substrate}$ represents the reflectance of the substrate;

$R_{\lambda,\ yellow}$ represents the reflectance of the yellow primary color;

$R_{\lambda,\ magenta}$ represents the reflectance of the magenta primary color;

Y represents the amount of yellow primary color; and

M represents the amount of magenta primary color.

In another preferred embodiment, the overprint is a green overprint and the at least two primary colors are yellow and cyan. In an especially preferred embodiment, the following mixing relation equation can be used to predict the calculated green overprint at a given wavelength ($\lambda$):

$$R_{\lambda,\ GREEN}(\lambda) = 10^{\{\log(R_{\lambda, substrate}) + Y[\log(R_{\lambda, yellow}) - \log q j] + C[\log(R_{\lambda, cyan}) - \log(R_{\lambda, substrate})]\}}$$

wherein $R_{\lambda,\ Green}$ represents the reflectance of the green overprint;

$R_{\lambda,\ substrate}$ represents the reflectance of the substrate;

$R_{\lambda,\ yellow}$ represents the reflectance of the yellow primary color;

$R_{\lambda,\ cyan}$ represents the reflectance of the cyan primary color;

Y represents the amount of yellow primary color; and

C represents the amount of cyan primary color.

In yet another preferred embodiment, the overprint is a blue overprint and the at least two primary colors are cyan and magenta. In an especially preferred embodiment, the following mixing relation equation can be used to predict the calculated blue overprint at a given wavelength ($\lambda$):

$$R_{\lambda,\ BLUE}(\lambda) = 10^{\{\log(R_{\lambda, substrate}) + C[\log(R_{\lambda, cyan}) - \log(R_{\lambda, substrate})] + M[\log(R_{\lambda, magenta}) - \log(R_{\lambda, substrate})]\}}$$

wherein $R_{\lambda,\ Blue}$ represents the reflectance of the blue overprint;

$R_{\lambda,\ substrate}$ represents the reflectance of the substrate;

$R_{\lambda,\ cyan}$ represents the reflectance of the cyan primary color;

$R_{\lambda,\ magenta}$ represents the reflectance of the magenta primary color;

C represents the amount of cyan primary color; and

M represents the amount of magenta primary color.

In a preferred embodiment, the trap estimation is used in in-line multi-color press printing. Periodically, the printing will be evaluated for trapping, by subjecting the overprint and primary color prints to the inventive trap estimation method. The overprint and primary color prints may be produced on separate pieces of the same substrate, but preferably the overprint and "test target" primary color prints will be printed at approximately the same time on the same piece of substrate.

It should be clear that the present invention manifests a number of advantages over the known methods. First, the present invention dispenses with the need to use color filters, and, therefore, avoids the inexactitude associated therewith. Second, the present invention also obviates the need to know the exact order in which the primary colors have been printed to make the overprint since, for example, in the case of a two primary color overprint, the primary color present in the greater amount will ordinarily be the first printed ink. Last, but not least, the present invention provides a simpler, more statistically valid method of determining the trap.

The invention will now be described in greater detail with reference to the following non-limiting working examples:

EXAMPLES

Example 1

An X-Rite® 938 spectrodensitometer (X-Rite, Inc., Grandville, Mich.) is used to measure the substrate relative, spectral reflectance factor curves for a red overprint and the yellow and magenta test target primaries. The spectral reflectance factor curve for the substrate is also measured, and this curve is subtracted from the substrate relative, spectral reflectance factor curves for the red overprint and the yellow and magenta primaries to yield ink only spectral reflectance factor curves for the overprint and the yellow and magenta primaries. The spectral reflectance factor curves for the red overprint, the yellow and magenta primaries, and the substrate are converted to the corresponding spectral density curves using the formula $D=-\log(R)$. The spectral densities for the red overprint, the yellow and magenta primaries and the substrate at a number of wavelengths are subjected to the mixing relation equation:

$$R_{\lambda,\ RED}(\lambda)=10^{\{\log(R_{\lambda,\ substrate})+Y[\log(R_{\lambda,\ yellow})-\log(R_{\lambda,\ substrate})]+M[\log(R_{\lambda,\ magenta})-\log(R_{\lambda,\ substrate})]\}}$$

and linear regression can be used to solve for Y and M. The result is $Y=0.6763$ and $M=0.9220$. The ratio of $Y/M=0.6763/0.9220$ yields an trap of 73.3% while the Preucil equation gives 75.4%. The square of the correlation coefficient ($R^2$) is 0.9996 and the standard error is 0.0011.

Example 2

Analogous to Example 1, the trap estimation method is applied to a green overprint using the yellow and cyan test target primaries. The spectral densities for the green overprint, the yellow and cyan primaries, and the substrate are subjected to the mixing relation equation:

$$R_{\lambda,\ GREEN}(\lambda)=10^{\{\log(R_{\lambda,\ substrate})+Y[\log(R_{\lambda,\ yellow})-\log(R_{\lambda,\ substrate})]+C[\log(R_{\lambda,\ cyan})-\log(R_{\lambda,\ substrate})]\}}$$

and linear regression can be used to solve for Y and C. The result is $Y=0.8098$ and $C=0.9750$. The ratio of $Y/C=0.8098/0.9750$ yields an trap of 81.1% while the Preucil equation gives 84.4%. The $R^2=0.9990$ and the standard error is 0.0004.

Example 3

Analogous to Example 1, the trap estimation method is applied to a blue overprint using the cyan and magenta test target primaries. The spectral densities for the blue overprint, the cyan and magenta primaries, and the substrate are subjected to the mixing relation equation:

$$R_{\lambda,\ BLUE}(\lambda)=10^{\{\log(R_{\lambda,\ substrate})+C[\log(R_{\lambda,\ cyan})-\log(R_{\lambda,\ substrate})]+M[\log(R_{\lambda,\ magenta})-\log(R_{\lambda,\ substrate})]\}}$$

and linear regression can be used to solve for C and M. The result is $C=0.9130$ and $M=0.7968$. The ratio of $M/C=0.7968/0.9130$ yields an trap of 87.3% while the Preucil equation gives 71.8%. The $R^2=0.9926$ and the standard error is 0.0008.

It should be understood that the preceding is merely a detailed description of one preferred embodiment or a small number of preferred embodiments of the present invention and that numerous changes to the disclosed embodiment(s) can be made in accordance with the disclosure herein without departing from the spirit or scope of the invention. The preceding description, therefore, is not meant to limit the scope of the invention in any respect. Rather, the scope of the invention is to be determined only by the appended issued claims and their equivalents.

What is claimed is:

1. A method of estimating the trap of an overprint of at least two primary colors, said method comprising the following steps:
    a) determining the spectral density curve of the overprint as a function of wavelengths by use of a spectrometer;
    b) using a computer to compute the amounts of said two primary colors that will produce a spectral density curve that matches the spectral density curve of the overprint; and
    c) relating said amounts to yield an estimate of the trap.

2. The method according to claim 1, wherein the spectral density curve of the overprint is determined by a method comprising the following steps:
    a) subjecting the overprint to a spectrodensitometer and determining a spectral reflectance factor curve for the overprint;
    b) converting the spectral reflectance factor curve for the overprint to a spectral density curve for the overprint using the formula:

$$D_\lambda=-\log(R_\lambda)$$

wherein
    $D\ \lambda$ represents the spectral density at a given wavelength; and
    $R\ \lambda$ represents the spectral reflectance at the given wavelength.

3. The method according to claim 2, wherein the spectral reflectance factor curve for the overprint is determined by a method comprising the following steps:
    a) determining the spectral reflectance factor curve for the overprint plus substrate;
    b) determining the spectral reflectance factor curve for the substrate alone; and
    c) subtracting the spectral reflectance factor curve for the substrate alone from the spectral reflectance factor curve for the overprint plus substrate to yield the reflectance factor curve for the overprint.

4. The method according to claim 1, wherein the amounts of said two primary colors that will produce a spectral density curve that matches the spectral density curve of the overprint are computed by a method comprising the following steps:
    a) subjecting each of said two primary colors to a spectrodensitometer and determining spectral reflectance factor curves for each of said two primary colors;
    b) converting the spectral reflectance factor curves for each of the two primary colors to spectral density curves for each of the two primary colors using the formula:

$$D\lambda=-\log(R)$$

wherein
    $D\lambda$ represents the spectral density at a given wavelength; and
    $R\lambda$ represents the spectral reflectance at the given wavelength;
    c) subjecting the spectral density curves for the overprint and for each of the two primary colors to the mixing relation equation:

$$D_{\lambda,\ overprint}=A_1 D_{\lambda,\ primary\ 1}+A_2 D_{\lambda,\ primary\ 2}$$

wherein $D_{\lambda, overprint}$ represents the spectral density of the overprint at a given wavelength;

$D_{\lambda, primary\ 1}$ represents the spectral density of a first primary color at the given wavelength;

$D_{\lambda, primary\ 2}$ represents the spectral density of a second primary color at the given wavelength;

$A_1$ represents the amount of the first primary color; and $A_2$ represents the amount of the second primary color.

5. The method according to claim 4, wherein the spectral reflectance factor curve for each of the two primary colors is determined by a method comprising the following steps:

a) determining the spectral reflectance factor curve for the primary color plus substrate;

b) determining the spectral reflectance factor curve for the substrate alone; and c) subtracting the spectral reflectance factor curve for the substrate alone from the spectral reflectance factor curve for the primary color plus substrate to yield the spectral reflectance factor curve for the primary color.

6. The method according to claim 4, wherein $A_1$ and $A_2$ are solved for by a linear regression analysis using measurements of $D_{\lambda, overprint}$, $D_{\lambda, primary\ 1}$ and $D_{\lambda, primary\ 2}$ obtained at at plurality of wavelengths.

7. The method according to claim 6, wherein $A_1$ and $A_2$ are solved for by a linear regression analysis using measurements of $D_{\lambda, overprint}$, $D_{\lambda, primary\ 1}$ and $D_{\lambda, primary\ 2}$ obtained at at least ten different wavelengths.

8. The method according to claim 1, wherein the amounts are related to yield an estimate of trap as follows:

$$T = \frac{\text{smaller of } A_1 \text{ or } A_2}{\text{larger of } A_1 \text{ or } A_2};$$

wherein

T represents the trap;

$A_1$ represents the amount of a first primary color; and $A_2$ represents the amount of a second primary color.

9. The method according to claim 1, wherein the overprint is a blute overprint and the at least two primary colors are cyan and magenta, wherein the following mixing relation equation predicts the calculated blue overprint at a given wavelength ($\lambda$):

$$R_{\lambda, Blue} = 10^{\{log(R_{\lambda, substrate}) + C[log(R_{\lambda, cyan}) - log(R_{\lambda, substrate})] + M[log(R_{\lambda, magenta}) - log(R_{\lambda, substrate})]\}}$$

wherein $R_{\lambda, Blue}$ represents the reflectance of the blue overprint;

$R_{\lambda, substrate}$ represents the reflectance of the substrate;

$R_{\lambda, cyan}$ represents the reflectance of the cyan primary color;

$R_{\lambda, magenta}$ represents the reflectance of the magenta primary color;

C represents the amount of cyan primary color; and

M represents the amount of magenta primary color.

10. The method according to claim 1, wherein the overprint and the at least two primary colors are yellow and magenta, wherein the following mixing relation equation predicts the calculated red overprint at a given wavelength ($\lambda$):

$$R_{\lambda, Red} = 10^{\{log(R_{\lambda, substrate}) + Y[log(R_{\lambda, yellow}) - log(R_{\lambda, substrate})] + M[log(R_{\lambda, magenta}) - log(R_{\lambda, substrate})]\}}$$

wherein $R_{\lambda, Red}$ represents the reflectance of the red overprint;

$R_{\lambda, substrate}$ represents the reflectance of the substrate; $R_{\lambda, yellow}$ represents the reflectance of the yellow primary color;

$R_{\lambda, magenta}$ represents the reflectance of the magenta primary color;

Y represents the amount of yellow primary color; and

M represents the amount of magenta primary color.

11. The method according to claim 1, wherein the overprint is a green overprint and the at least two primary colors are yellow and cyan, wherein the following mixing relation equation predicts the calculated green overprint at a given wavelength ($\lambda$):

$$R_{\lambda, Green} = 10^{\{log(R_{\lambda, substrate}) + Y[log(R_{\lambda, yellow}) - log(R_{\lambda, substrate})] + C[log(R_{\lambda, cyan}) - log(R_{\lambda, substrate})]\}}$$

wherein $R_{\lambda, Green}$ represents the reflectance of the green overprint;

$R_{\lambda, substrate}$ represents the reflectance of the substrate;

$R_{\lambda, yellow}$ represents the reflectance of the yellow primary color;

$R_{\lambda, cyan}$ represents the reflectance of the cyan primary color;

Y represents the amount of yellow primary color; and

C represents the amount of cyan primary color.

\* \* \* \* \*